455-6 AU 233 EX
9/23/82 XR 4,352,200

United States Patent [19]

Oxman

[11] 4,352,200

[45] Sep. 28, 1982

[54] WIRELESS AIRCRAFT PASSENGER AUDIO ENTERTAINMENT SYSTEM

[75] Inventor: Martin H. Oxman, Malden, Mass.

[73] Assignee: Bell and Howell Company, Chicago, Ill.

[21] Appl. No.: 82,849

[22] Filed: Oct. 9, 1979

[51] Int. Cl.$^{3}$ .............................................. H04B 5/00

[52] U.S. Cl. ........................................ 455/41; 455/55; 455/6; 179/82; 179/1 AT

[58] Field of Search ....................... 455/41, 42, 49, 39, 455/53, 55, 57, 272, 274, 6, 132; 179/82, 1 VE, 1 AT; 35/8 R; 340/310 R, 310 A, 310 CP

[56] References Cited

U.S. PATENT DOCUMENTS

| | | | |
|---|---|---|---|
| 2,567,431 | 9/1951 | Halstead | 455/41 |
| 2,851,537 | 9/1958 | Rosenberg | 179/82 |
| 2,908,766 | 10/1959 | Taylor | 179/82 |
| 3,162,726 | 12/1964 | Rosenberg | 179/82 |
| 3,474,451 | 10/1969 | Abel | 179/82 |
| 4,165,487 | 8/1979 | Corderman | 455/41 |

OTHER PUBLICATIONS

Guided Radiation . . . The Key to Tunnel Talking, R. A. Farmer, IEEE Transactions on Vehicular Communications, Mar. 1965, vol. VC-14.

MC 141506, Motorola Semiconductors Advance Information Bulletin ADI-431, (1977).

RCA Integrated Circuits, Linear Integrated Circuits, RCA Integrated Circuits Data Book 1976, pp. 118-122.

*Primary Examiner*—Tommy P. Chin
*Attorney, Agent, or Firm*—Benoit Law Corporation

[57] ABSTRACT

Audio information in several audio channels is supplied via head sets to passengers seated aboard an aircraft in rows of seats including armrests and being distributed along an elongate passenger section inside a metallic fuselage. According to the subject invention, an antenna is run along the elongate passenger section of the aircraft for radio transmission inside such elongate passenger section. Individual antennas are provided for the passenger seats for receiving the latter radio transmission. These receiving antennas are distributed among predetermined armrests of the passenger seats. The audio information to be transmitted is provided in radio frequency channels in a band between 72 and 73 MHz. The distributed receiving antennas are coupled via seated passengers to the transmitting antenna. The radio frequency channels are transmitted in the mentioned band via the transmitting antenna, seated passengers and distributed receiving antennas to the predetermined armrests. Audio information is derived in the audio channels from the transmitted radio frequency channels also in the predetermined armrests. Passengers are individually enabled to select audio information from among the derived audio information in the audio channels. The selected audio information is applied individually to the headsets.

25 Claims, 9 Drawing Figures

WIRELESS AIRCRAFT PASSENGER AUDIO ENTERTAINMENT SYSTEM

BACKGROUND OF THE INVENTION

1. Field of the Invention

The subject invention relates to systems for entertaining and informing passengers aboard aircraft and, more specifically, to wireless methods and apparatus for supplying audio information in several channels to passengers seated inside a metallic fuselage.

2. Disclosure Statement

In contemporary airline traffic, passengers are supplied with audio information for several reasons, including the communication of safety instructions, flight information and news and the provision of audio entertainment and sound accompaniment for motion pictures or video programs displayed during the flight. In practice, such audio information is distributed among the airline passengers in different channels for individual reception via headsets, so that passengers are enabled to effect selections among different music or other audio presentations, or to receive the audio accompaniment of a motion picture or video presentation they may be viewing, or to choose to be undisturbed by any of the audio information received by other passengers.

Two systems are currently in use for supplying audio information of the above mentioned type in several channels to seated commercial airline passengers. One of these employs wire harnesses extending from a central station in the aircraft to individual program selector and sound transducer units in armrests of passenger seats. The other system employs time division multiplexing to combine multiple audio channels for distribution over a coaxial cable system to passenger seat mounted decoders.

At the central station, electric signals oscillating in the audio frequency range and containing audio information in different channels are generated and applied to the wire harness system or multiplex encoder, in each respective system. At each armrest unit, a selector switch enables the passenger seated at that unit to select one of several active channels for listening. The electric signal of the selected channel may also be varied in amplitude through a passenger-actuated volume control.

The selected and volume-controlled electric signal is transduced to a corresponding sound signal for auditory reception by the selecting passenger. For this purpose, each participating passenger is typically provided with a headset. In principle, electric-to-sound transducers may be provided in the headsets supplied to the passengers. However, existing systems typically employ pneumatic heatsets, which are more economical to manufacture, easier to clean and sanitize between uses, and less vulnerable to theft than electric headsets, which would be more valuable and have more uses outside the aircraft. In the case of pneumatic headsets, a dual or stereo electric signal-to-sound signal transducer is located in the armrest unit and has a pair of plug-in openings for receiving a double barrel plug of the pneumatic headset. A pair of second conducting flexible tubes leads from that double barrel plug to a pair of different earpieces which are held against portions of the wearer's ears for high-fidelity listening.

In practice, these prior-art audio entertainment systems have been a source of severe trouble to the airlines, requiring a disproportionate amount of servicing and trouble-shooting. On the other hand, the type of audio information system herein under consideration is filling an increasing public need in terms of passenger information, edification, diversion and entertainment. Especially passengers beset by air fright are often calmed by their listening to a familiar or interesting program, while international travelers often find it useful to familiarize themselves with the language of a host country through their listening to video sound accompaniments, news or spoken programs.

By far the most troublesome component of conventional systems of the subject type has been the wire harness, displaying a particularly chronic vulnerability at the cabin wall/passenger seat interface or cabin floor/passenger seat interface.

Of course, a wireless approach has for a long time been employed in the communications industry whenever use of a wire system was impossible or inconvenient. However, anyone contemplating a wireless system for passenger entertainment inside an aircraft quickly would have been discouraged by a number of formidable obstacles. For one thing, it is difficult to cover the universally elongate space of the airplane passenger section uniformly with a wireless system. On the other hand, radio frequency signals or interference emitted by a high-fligning aircraft easily covers a huge space and large land and sea masses in a practically unobstructed manner, thereby interfering with a multitude of radio broadcasting, television, radio astronomy, radio navigation and security systems.

Also, if the most vulnerable part of prior-art systems, namely, the cabin wall or floor/passenger seat interface is to be avoided, the provision of an individual antenna for each seating unit becomes practically unavoidable in a wireless system. This in practice poses a very difficult problem, since airline passenger seats are subject to safety requirements, maintenance operations and cleaning procedures which in effect discourage the use of any antenna or other electronic equipment at any place other than the current location of the audio entertainment receptacle in the armrest of the passenger seat. However, from an overall point of view, that would appear to be the least suitable position for a receiving antenna, since the armrest includes metallic structural parts that would shield a built-in antenna against radio reception, while affording at best a very limited space for the placement of an antenna. Also, an armrest, along with adjacent portions of a seat, is naturally located in the region most likely shielded by the body of a seated airline passenger.

Of course, a traditional approach to problems of the latter type has been to increase power and, if possible, select a frequency so as to bring about penetration through unavoidable obstacles. By way of example, such an approach has been employed in the wireless paging field operating typically in buildings or over land surfaces. In an airborne situation, there are, however, definite low-level limits to such an approach, since any increase in transmitted power beyond a rather low level may spell potential interference with the aircraft's navigational and safety system.

Increased transmitter power and changes in transmitter frequency may also expose the navigational systems of other aircraft, as well as the operation of radio communication, television, radio astronomy and other radio frequency systems to interference either through the transmitted signals themselves or through one or more of their harmonics. Also, if several aircraft were to be equipped with wireless audio entertainment systems, it would be important to prevent mutual interference among such systems.

Another problem arises in connection with the transmitting antenna. From the point of view of conventional radio engineering, it would appear best to provide a dipole-type of antenna as the transmitting antenna for a wireless radio entertainment system along one of the bulkheads or class dividers running athwart the passenger cabin. However, this would not provide a uniform coverage of the passenger section at an acceptable power level.

In consequence, the prior art was unable to overcome the above mentioned disadvantages and obstacles, and to meet the above mentioned needs.

In this respect, even measures adopted or proposals made in other fields do not offer much concrete assistance to the person having ordinary skill in the subject art. For instance, antennas in the form of wires extending along underground or underwater tunnels, such as automobile traffic or railroad tunnels, have been used for years to maintain radio broadcast reception or radio communication with respect to automobiles, trains or other vehicles.

For instance, the article by R. A. Farmer and N. H. Shepherd, "Guided Radiation. The Key to Tunnel Talking", IEEE Transactions on VEHICULAR COMMUNICATIONS, Vol. VC-14, No. 1 (March 1965) pp. 93 to 102, discusses "indoor space" two-way mobile radio communication at 160 MHz. This, however, is within less than 10% of the frequency of 150 MHz which has been designated as "almost the worst frequency" which could be chosen for tunnel transmission in an article by N. Monk and H. S. Winbigler, entitled "Communication with Moving Trains in Tunnels", IRE Transactions on VEHICULAR COMMUNICATIONS, Vol. PGVC-7 (December 1956) pp. 21 to 28, at 24/25. Also, the wavelength of 160 MHz would approach values at which substantial amounts of the transmitted energy could penetrate the airplane windows, thereby raising the danger of interference with systems, such as certain maritime and railroad communication systems, operating at that frequency. The latter IRE article also makes the point that there is a change-over from free-space to waveguide transmission at a critical cut-off frequency, considering the tunnel as a circular waveguide. On page 24, that article designates such cut-off frequencies as being in the order of 50 MHz. Even though FIG. 7 of that article shows the effect of cut-off and transmission change-over in terms of a tunnel occupied by a train, that FIG. 7 appears to demonstrate strongly that frequencies occurring in a cut-off or change-over region would not be suitable for transmission purposes.

In terms of a practically "empty tunnel" such as constituted by the metallic fuselage of an aircraft, it would thus appear from the IRE article that no suitable audio system transmission frequency above television channel 4 and below the aeronautical marker beacon and radio astronomy band could be found.

Conventional know-how on "indoor space" or tunnel transmission thus would appear to have a discouraging effect on a person of average skill, as far as any transfer of such transmission technology to the transmission of information in the passenger section of aircraft is concerned.

Another problem arises from the fact that modern airline entertainment systems require as many as a dozen program channels, which would raise considerable problems if wireless transmission of the channels through the aircraft were attempted at high-fidelity quality.

There thus exists a need to reduce transmission bandwidth requirements in systems of the type here under consideration, as well as in wireless multichannel systems in general. Especially aboard aircraft, this is paralleled by a need to minimize bulk and weight of multiplexing systems.

SUMMARY OF THE INVENTION

It is a general object of this invention to overcome the above mentioned disadvantages and obstacles and meet the above mentioned needs.

It is a related object of this invention to promote the comfort and safety of air travel and to lessen delay and expense through reduction of required troubleshooting and maintenance.

It is a germane object of this invention to provide improved methods and apparatus for supplying audio information in several channels via headsets to seated airline passengers.

It is a related object of this invention to provide wireless airline passenger audio entertainment and information systems.

It is also an object of this invention to provide a system of the latter type at an acceptable transmitter signal power level.

It is a related object of this invention to provide a system of the latter type within an acceptable frequency band.

It is also an object of this invention to provide improved utilization of system bandwidth in multichannel frequency modulation transmission systems.

Other objects of this invention will become apparent in the further course of this disclosure.

From one aspect thereof, the subject invention resides in a method of supplying audio information in several audio channels via headsets to passengers seated aboard an aircraft in rows of seats including armrests and being distributed along an elongate passenger section inside a metallic fuselage. The method according to this aspect of the invention comprises in combination the steps of running a transmitting antenna along the passenger section of the aircraft for radio transmission inside such elongate passenger section in a frequency range including at least a band between 72 and 73 MHz, providing individual antennas for the seats for receiving the radio transmission and distributing such receiving antennas among predetermined armrests of the seats, providing the audio information in radio frequency channels in said band between 72 and 73 Mhz, coupling the distributed receiving antennas via seated passengers to the transmitting antenna, transmitting the radio frequency channels in the band via the transmitting antenna, seated passengers and distributed receiving antennas to the predetermined armrests, deriving the audio information in the audio channels from the transmitted radio frequency channels in the predetermined armrests, individually enabling passengers to select audio information from among audio channels containing the derived audio information, and applying the selected audio information individually to the heatsets.

From another aspect thereof, the subject invention resides in a method of supplying audio information in several audio channels to passengers aboard an aircraft. The invention according to this aspect resides, more specifically, in the improvement comprising in combination the steps of providing several radio frequency carriers, each corresponding to a different one of the audio channels and each having a frequency different from the frequency of any other carrier of the several carriers, modulating the radio frequency carriers with audio signals by modulating audio signals in each channel on the corresponding radio frequency carrier, providing an antenna in the aircraft, applying the modulated radio frequency carriers at their respective frequencies directly and simultaneously to the antenna, and transmitting the applied modulated radio frequency carriers at their respective frequencies with the antenna in the aircraft.

From another aspect thereof, the subject invention resides in a method of transmitting signals in several distinct signal channels simultaneously via a single antenna system. The invention according to this aspect resides, more specifically, in the improvement comprising in combination the steps of providing several radio frequency carriers, each corresponding to a different one of the signal channels and each having a frequency different from the frequency of any other carrier of the several carriers, modulating the radio frequency carries with signals in the signal channels by modulating the signals in each channel on the corresponding radio frequency carrier, applying the modulated radio frequency carriers at their respective frequencies directly and simultaneously to the single antenna system, and transmitting the applied modulated radio frequency carriers at their respective frequencies with the single antenna system.

From another aspect thereof, the subject invention resides in apparatus for supplying audio information in several audio channels via headsets to passengers seated aboard an aircraft in rows of seats including armrests and being distributed along an elongate passenger section inside a metallic fuselage. The apparatus according to this aspect of the invention comprises, in combination, first means for providing the audio information in radio frequency channels in a frequency band between 72 and 73 MHz, second means connected to the first means and including an antenna extending along the elongate passenger section of the aircraft for transmitting the radio frequency channels inside the elongate passenger section of the aircraft, third means including individual antennas for the seats for receiving the transmitted radio frequency channels, fourth means connected to the receiving antennas for deriving the audio information in the audio channels from the received radio frequency channels, fifth means connected to the fourth means for individually enabling passengers to select audio information from among audio channels containing the derived audio information, sixth means connected to the fifth means for applying the selected audio information individually to the headsets, and seventh means for distributing the receiving antennas, fourth means, fifth means and sixth means among the seats, including means for mounting the receiving antennas, fourth means, enabling means and sixth means at last partially in predetermined armrests of the seats.

From another aspect thereof, the subject invention resides in apparatus for supplying audio information in several audio channels to passengers aboard an aircraft. The invention according to this aspect resides, more specifically, in the improvement comprising, in combination, means for providing several radio frequency carriers, each corresponding to a different one of the audio channels and each having a frequency different from the frequency of any other carrier of the several carriers, means connected to the providing means for modulating the radio frequency carriers with audio signals, including means for modulating audio signals in each channel on the corresponding radio frequency carrier, an antenna in the aircraft, and means connected to the modulating means for applying the modulated radio frequency carriers at their respective frequencies directly and simultaneously to the antenna for transmission thereby.

From another aspect thereof, the subject invention resides in apparatus for transmitting signals in several distinct signal channels simultaneously via a single antenna system. The invention according to this aspect resides, more specifically, in the improvement comprising, in combination, means for providing several radio frequency carriers, each corresponding to a different one of said signal channels and each having a frequency different from the frequency of any other carrier of the several carriers, means connected to the providing means for modulating the radio frequency carriers with signals in the signal channels, including means for modulating the signals in each channel on the corresponding radio frequency carrier, and means connected to the modulating means for applying the modulated radio frequency carriers at their respective frequencies directly and simultaneously to the single antenna system for transmission thereby.

BRIEF DESCRIPTION OF THE DRAWINGS

The subject invention and its various aspects and objects will become more readily apparent from the following description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
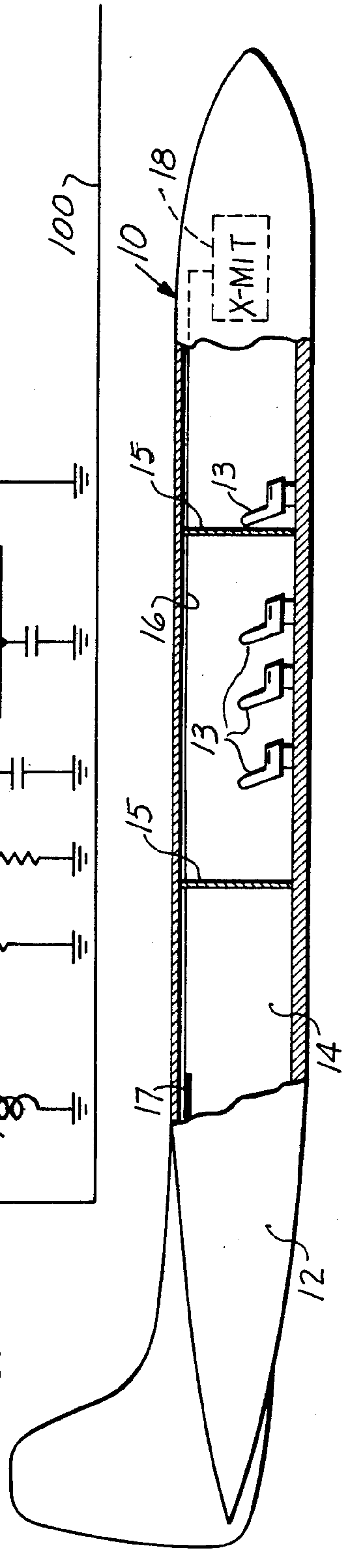
FIG. 1 is a diagrammatic side view, partially in section, of an aircraft and essential parts of a wireless passenger audio entertainment and information system according to a preferred embodiment of the subject invention.
Figure 2:
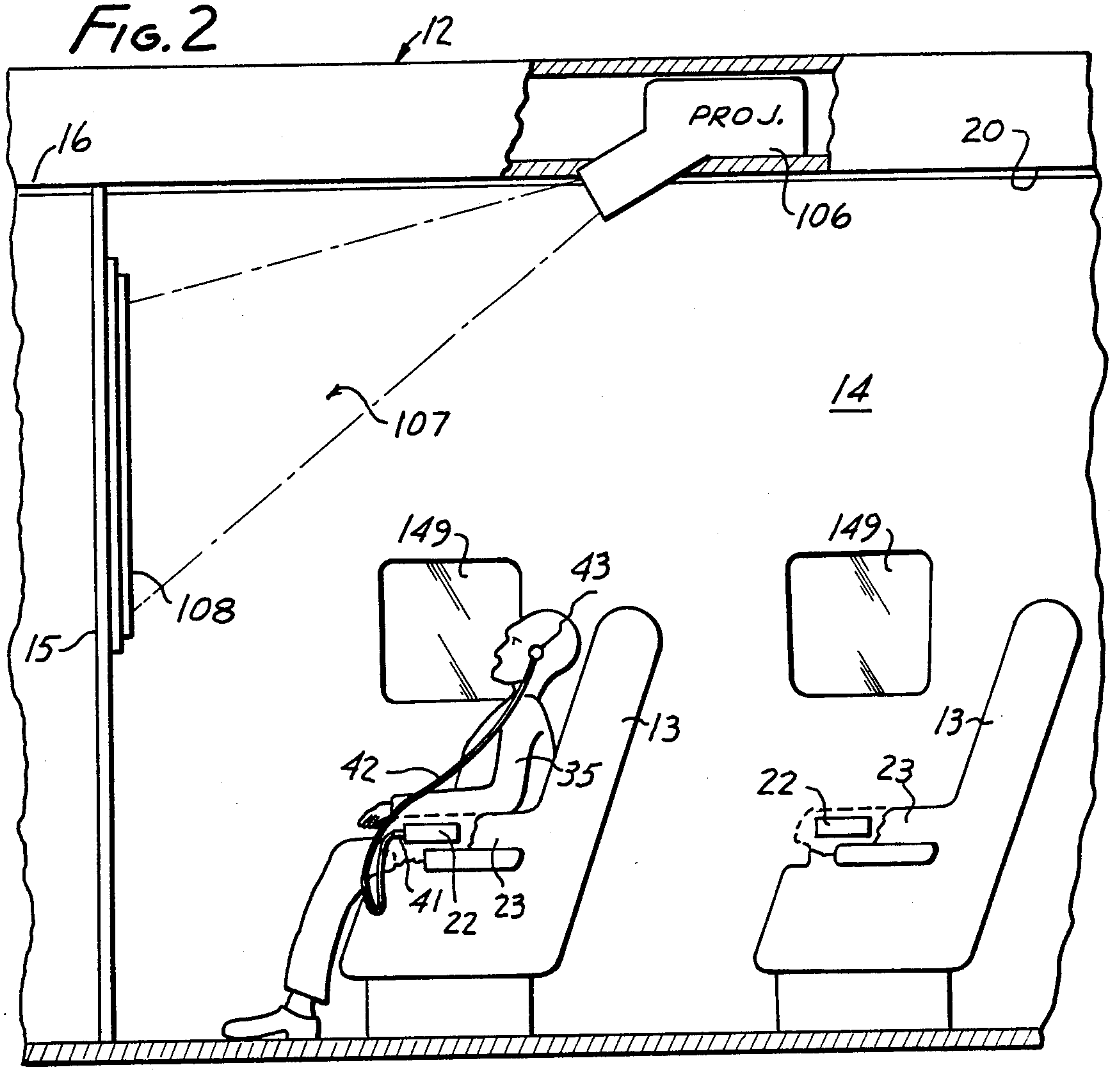
FIG. 2 is a showing on an enlarged scale of a detail of FIG. 1, together with an illustration of additional features.

FIG. 1 shows essential parts of an airliner 10 having a metallic fuselage 12 partially in section. In accordance with standard practice, passengers are seated aboard the aircraft in rows of seats 13. For the sake of simplicity only some of these seats are shown in FIGS. 1 and 2. In reality, and in accordance with standard practice, the seats 13 are, however, distributed along an elongate passenger section 14, extending according to FIG. 1 inside the metallic fuselage 12 from the cockpit, toilet and service area at the front of the plane to the service, storage and toilet region at the tail end thereof. Also in accordance with standard practice, the passenger section is subdivided into classes or other passenger compartments by class dividers or bulkheads 15. In larger planes, storage and toilet facilities may, for instance, also be located at the bulkheads 15.

According to the subject invention an antenna 16 is run along the elongate passenger section 14 for radio transmission inside such elongate passenger section in a frequency range including at least a band between 72 and 73 MHz. By way of example, the antenna 16 may be composed of a twin lead. In a prototype system according to a preferred embodiment of the subject invention, a 300Ω television twin cable was employed for the antenna 16 with a 300Ω termination 17 at the end thereof. As seen in FIG. 1, the transmitting antenna 16 is run or extends from a transmitter 18 to the antenna termination 17 along the elongate passenger section 14 of the aircraft.

In very large airplanes, the transmitting antenna may be subdivided into sections. However, even in that case will the antenna structure run along the passenger section of the aircraft and only the maximum power provided for a single-section antenna will be employed and distributed over all sections.

The system according to the subject invention includes a transmitter 18 for providing the audio information in radio frequency channels in a frequency band between 72 and 73 MHz. Practical tests have confirmed that the use of that frequency band permits an entire aircraft of the size of a Boeing 727 to be covered with radio-transmitted audio information and entertainment programs at all seats throughout the entire length of the plane's passenger section at an unprecedentedly low-power input to the antenna not in excess of 10 mW per channel. This in practice avoids inference with the plane's navigational system. Also, tests have confirmed that the transmission frequency band between 72 to 73 MHz according to the subject invention avoids radiation and loss of significant amounts of radio frequency energy through the types and sizes of windows customarily employed in commercial aircraft. In other words, the metallic fuselage 12 even though penetrated by a multitude of airplane windows, has been found an effective shield against an escape of any significant energy from the antenna 16 and passenger section 14 beyond the confines of the airplane 10. This is believed to be a remarkable feature, in the light of the fact that the transmitting antenna 16 runs along the entire length of the passenger section 14.

In this respect, a more directed transmission could be expected from dipole antennas which would be attached to or built into the hollow or cellular space in the class dividers or bulkheads 15 to run across or athwart the elongate passenger section 14. However, no even coverage of different passenger seating locations throughout the passenger section 14 would be possible with such a transverse antenna type and, as compared to the lengthwise antenna 16, a several times higher antenna power input would be required to reach all seats. For instance, a transmitter output power of 50 mW was employed for a single channel in a test using a dipole antenna taped to the class divider 15. This compares very unfavorably to the above mentioned transmitter power not in excess of 10 mW per channel for the lengthwise antenna system 16 according to the subject invention.

As a further advantage, the mentioned frequency band according to the invention can neither interfere with public broadcasts, of which television channel 4 is closest with a frequency band between 66 and 72 MHz, nor with radio astronomy located in a band of from 73 to 74.6 MHz, below the aeronautical marker beacon frequency of 75 MHz. Also, the band of 72–73 MHz is currently used by low-power communication devices used for auditory training systems and licensed operational fixed stations. Again, the disclosed features of the subject invention avoid interference with other systems and stations in the particular band.

The lengthwise antenna 16 according to a preferred embodiment of the subject invention is preferably run along or inside an upper wall or ceiling structure of the aircraft or passenger section. As shown in FIG. 2, the antenna 16 may advantageously run along the ceiling 20 of the passenger cabin or section 14.

In technical terms, the antenna 16 is a distributed anntenna exhibiting no resonance or standing waves that would lead to discontinuities in the distribution of the radiated power and emission of interference to the outside of the aircraft. In this respect, while FIG. 1 indicates feeding of the antenna 16 by a transmitter 18 from one end thereof, the antenna 16 could, in practice, be fed from another point, such as from the middle of the aircraft or passenger section 14 by a coaxial cable.

However, irrespective of any such feeding, the transmitting antenna would still be considered as one antenna or antenna structure running the length of the passenger section 14 of the aircraft 10 inside the metallic fuselage 12.

The transmitter 18 provides the audio information in radio frequency channels in the frequency band between 72 and 73 MHz according to the subject invention. Each audio channel may thus be located in a different radio frequency channel within the mentioned band. In practice, this may, for instance, be accomplished by multiplexing the audio channels onto a single radio frequency carrier modulated thereby. Alternatively, each audio channel may be modulated on a different radio frequency channel. In either case, the same transmitting antenna 16 is employed for all channels.

For the reception of the transmitted radio frequency channels, individual antennas are provided for the seats 13. For instance, a separate receiving antenna may be provided for each seat 13 seating a passenger to be equipped with a headset for audio information and entertainment listening. In this respect, traditional radio engineering judgment would advise against a combination of the receiving antenna with the passenger control unit 22 in the seat armrest 23. Rather, the obvious goal of conventional radio engineering would be to locate the receiving antenna at a location which is less obstructed by the body of the seated passenger and less shielded by unavoidable metallic structure than the armrest region. Also, conventional radio engineering would strive for a half or quarter-wavelength dipole antenna for optimum reception of the transmitted radio frequency channel. The lack of feasibility of such conventional approaches in terms of safety requirements, maintenance operations and cleaning procedures pertaining to airline passenger seats, and in terms of containment, and avoidance of uneven distribution, of the transmitted energy within the elongate passenger section 14, would further discourage those of average skill from attempting the development and design of a wireless audio information and entertainment system for airline passengers.

The subject invention, however, again deviates from conventional approaches by distributing the individual receiving antennas 25 among predetermined armrests 23 of the seats 13. A passenger control unit 22 and receiving antenna 25 is typically installed in one armrest per seat.

Figure 3:
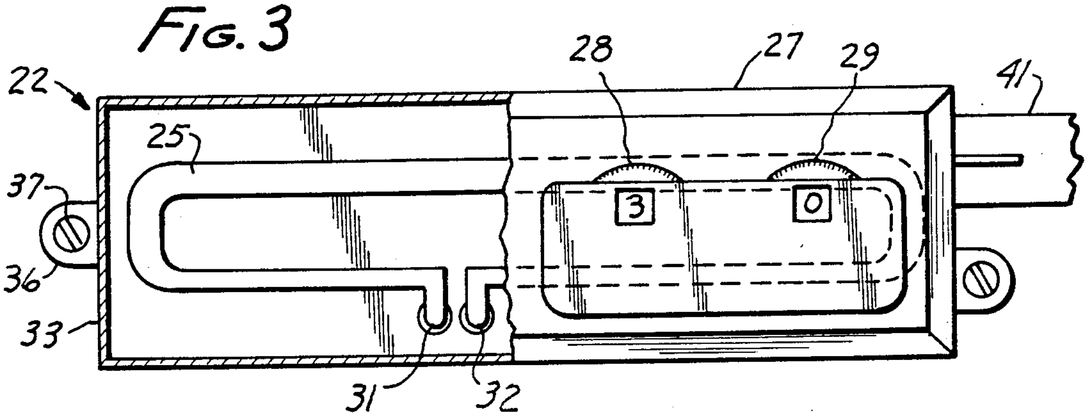
FIG. 3 is a passenger control unit equipped in accordance with a preferred embodiment of the subject invention.

According to the preferred embodiment of the invention illustrated in FIG. 3, the receiving antenna 25 is a loop antenna. In particular, a loop of copper foil or other conductive material is mounted or located behind the electrically insulating or plastic panel 27 which carries the passenger channel selection and volume controls 28 and 29. The loop antenna 25 is connected to a pair of antenna terminals 31 and 32 connected to equipment, located in a casing 33, for deriving the transmitted audio information in their audio channels from the radio frequency channels received with the antenna 25. The channel selector 28 with associated equipment in the casing 33 individually enables passengers to select audio information from among audio channels containing the derived audio information. The volume control 29 with associated equipment, including an electric signal-to-sound signal transducer in the casing 33, are connected to the channel selection enabling equipment for applying the selected audio information individually to the headsets. Typically, any one passenger control unit 22 thus applies the selected audio information to a single headset for a particular passenger.

Practical tests have now confirmed that the system of the subject invention effectively couples the distributed receiving antennas 25 via seated passengers to the transmitting antenna 16, and that the radio frequency channels containing the audio information are effectively transmitted in the above mentioned band between 72 and 73 MHz via the transmitting antenna 16, seated passengers 35 and distributed receiving antennas 25 to the predetermined armrests 23 equipped with passenger control units 22.

By way of example, the passenger control units 22 may be installed in armrests of both Hardman and Weber coach seats of the type frequently used aboard commercial aircraft. Lugs 36 and screws 37, or other suitable fasteners, may be employed for this purpose.

The antennas 25 with associated receiving equipment are thus at least partially mounted in predetermined armrests 23 of the seats 13. The receiving antenna 25 preferably is located at the side of the passenger control unit 22 facing a side of the seated passenger 35, so as to assure optimum antenna/passenger coupling through the plastic or dielectric control unit front panel 27. In this respect, the operation of the subject invention confirms a fact previously known from the radio paging field, namely that the human body acts in effect as an antenna or coupling medium at frequencies below 100 MHz, while acting as a radio frequency shield at very high frequencies above the 100 MHz area. In the context of the subject invention, this helps the system to overcome the fact that the necessarily short loop antenna 25 cannot of itself achieve the gain of a one-quarter or one-half wavelength dipole.

The transmitted audio information is typically of a high-fidelity character and, in a manner known per se, is pneumatically conveyed from the passenger control unit 22 via a dual channel plug-in device 41 and pair of flexible sound conducting tubes 42 to the passenger's headset 43.

According to a preferred embodiment of the subject invention, a frequency modulation system is employed for transmitting the audio information and entertainment to the passenger seats. In this respect, FIGS. 4 to 6, when aligned longitudinally in series, constitute a circuit diagram of frequency modulation receivers for the passenger control units 22 in accordance with a preferred embodiment of the subject invention.

Figure 5:
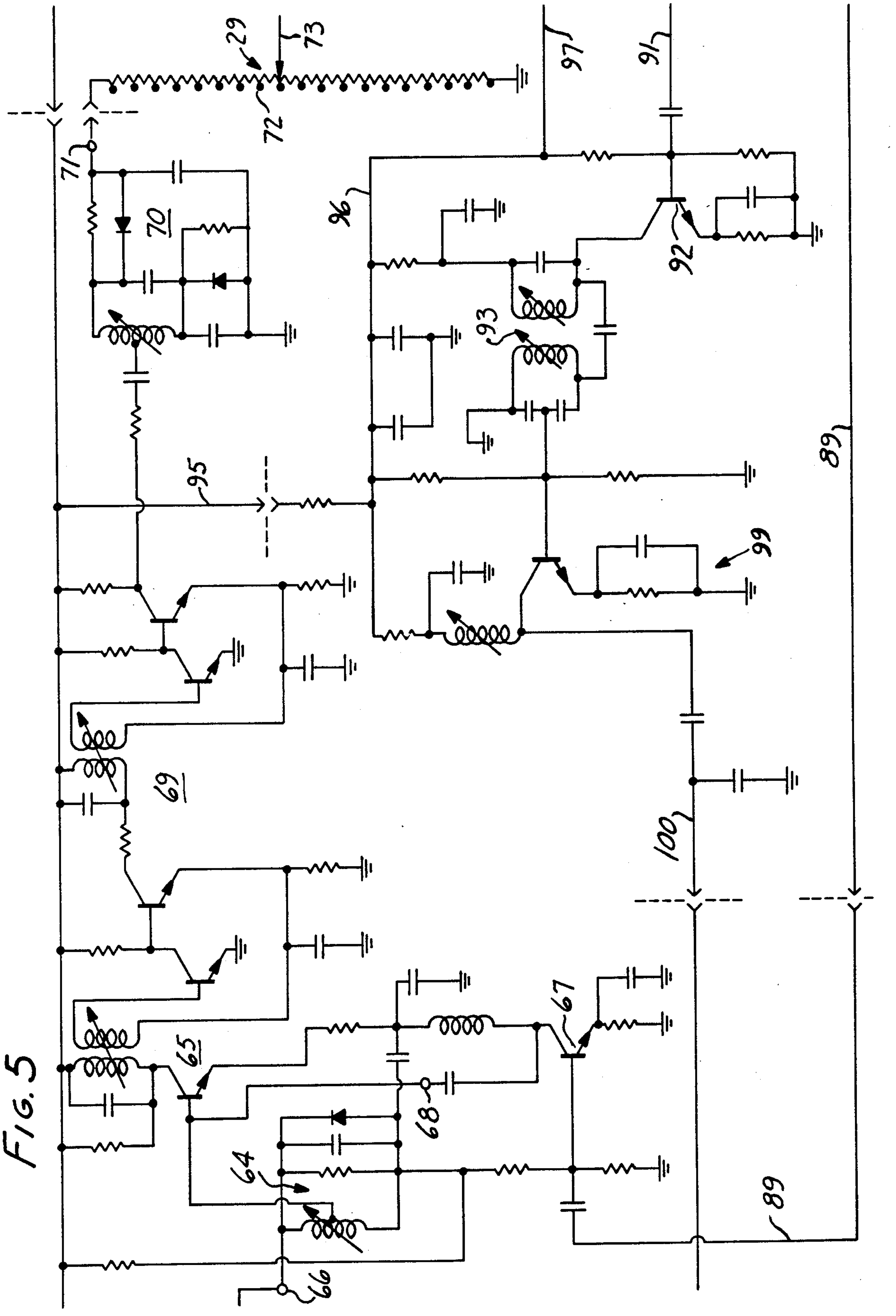
Figure 6:
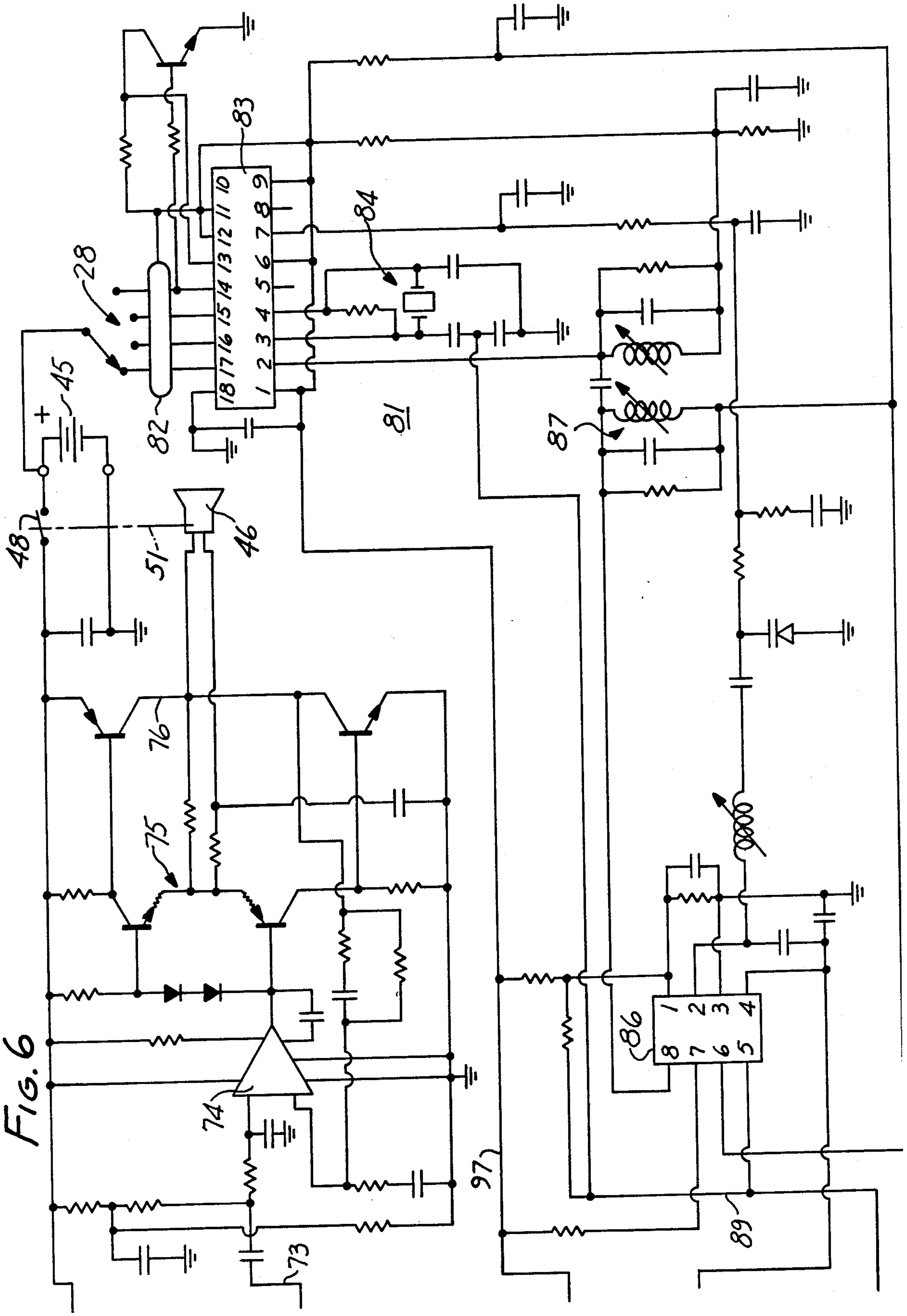

As indicated in FIG. 6, each passenger control unit 22 can be individually powered by a replaceable battery 45. Use of a replaceable battery in each passenger control unit 22 as its power source aids the wireless system in completely eliminating all electrical leads from the chronically vulnerable cabin wall or floor/passenger seat interface. On the other hand, use of batteries at first sight has the obvious disadvantage of requiring frequent maintenance to either replace or recharge the batteries in the large number of passenger control units. The preferred embodiment of the frequency modulation receiver shown in FIGS. 4 to 6 overcomes this apparent handicap by providing full volume sound at its output transducer 46 at a power requirement permitting prolonged operation between needed battery replacements. For example, an operating time on the order of 1000 hours results from a battery having a 20 ampere hour capacity. On the average, 1000 hours of operation translates practically into about one year of intermittent service as to a typical passenger aircraft.

The power source 45 may be disconnected from the set by an on-off switch 48. To preclude battery drain at the end of a listening cycle, the preferred embodiment according to FIG. 6 combines the switch 48 with the sound transducer 46 as indicated by the phantom line 51, so as to effect closure of the switch 48 only upon insertion of the pneumatic takeoff plug 41 (see FIG. 3) into the sound transducer 46. Conversely, the safety switch 48 is automatically reopened when the headset plug 41 is removed from the passenger control unit 22. Since flight attendants routinely collect all headsets near the end of each flight, the automatically actuated switch 48 as a minimum precludes battery drain between flight operations.

Figure 4:
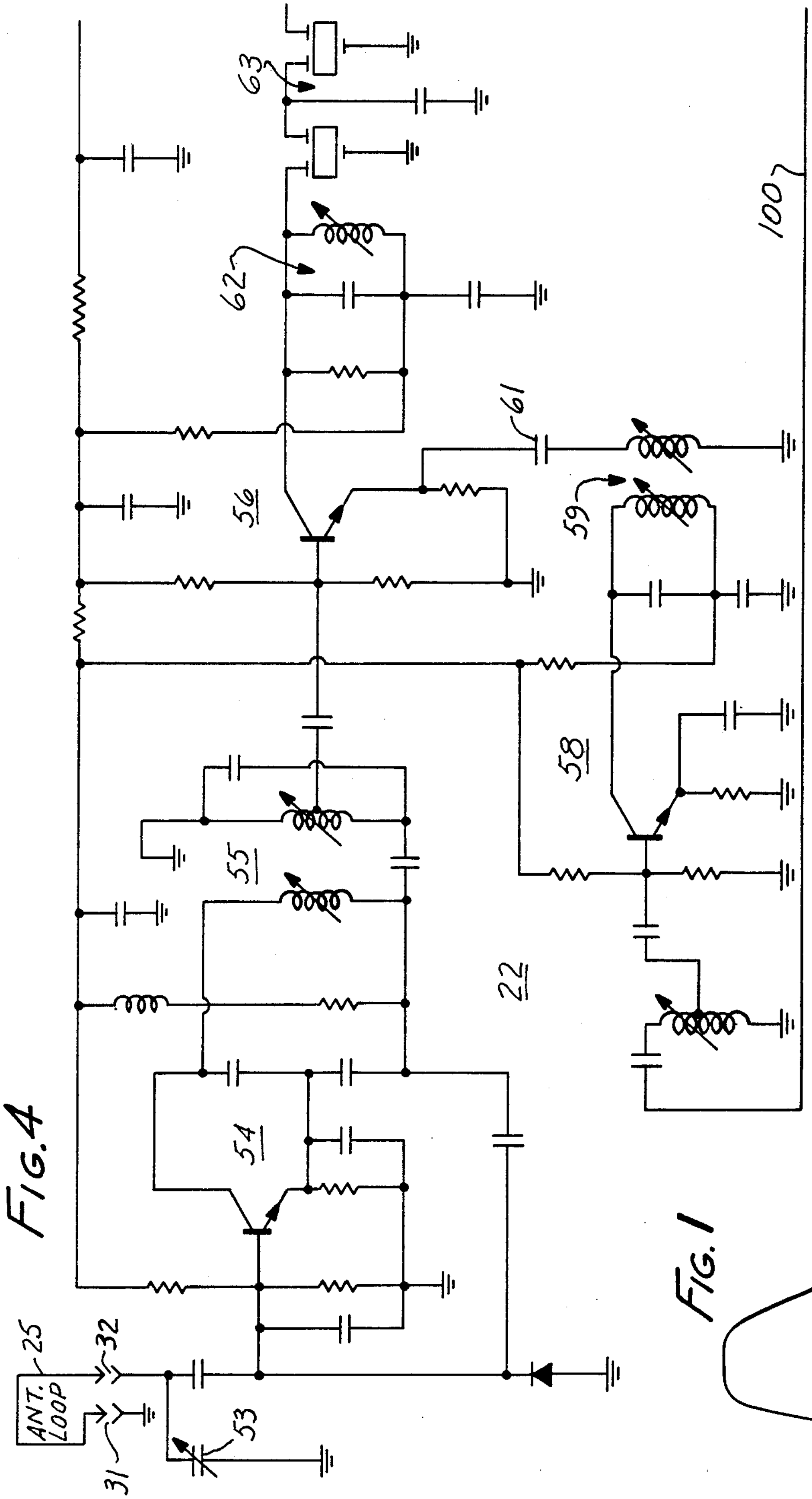
FIGS. 4 to 6, when positioned in series along their longitudinal axes, constitute a circuit diagram of a radio receiver in a passenger control unit according to a preferred embodiment of the subject invention.

As shown in FIG. 4, the loop antenna 25 is in the passenger control unit connected to ground via terminal 31 and to a trimmer capacitor 53 and HF broadband amplifier 54 via antenna terminal 32. The amplified high frequency signal proceeds via a double tuned bandpass filter circuit 55 to a first mixer 56 which produces the first intermediate frequency or IF signal. The first input of the mixer 56 is supplied as mentioned above by the HF amplifier 54 and BPF 55. A second input of the mixer 56 is supplied by a frequency multiplier 58 via transformer 59 and coupling capacitor 61. The multiplier 58 is part of a synthesizer shown primarily in FIGS. 5 and 6, and, as more fully described below, enabling passenger to tune in on the various transmitted channels of the audio entertainment and information system.

The output of the IF mixer proceeds via impedance matching circuit 62 and crystal filter 63 to a terminal 66 and filter output impedance matching circuit 64 shown in FIG. 5, and hence to a second mixer 65.

The second mixer 65 receives a first input from the BPF 63 via the matching circuit 64, and a second input from the above mentioned synthesizer, shown more fully in FIG. 6, via a buffer amplifier 67 and terminal 68. The second mixer 65 then supplies the second IF via a second amplifier 69 to the discriminator 70. The demodulated or electric audio signal is applied via a terminal 71 across the resistor 72 of the volume control 29. This volume control is preferably of a stepped type to enhance the reliability of the volume control adjustment mechanism.

The volume controlled electric sound signal is applied via wiper lead 73 to an audio amplifier 74, followed by power amplifier stages 75 and 76 which drive the pneumatic output transducer 46 with full peak-to-peak battery voltage power without any transformer or other significant loss-producing components.

In principle, each passenger control unit could be tuned by means of a variable-capacitor or similar traditional radio tuning circuit. Each passenger could then turn a dial until he or she reaches a desired audio channel. Such a continuous type of channel selection would, however, compare poorly to the stepped of detent-type of channel selection now available in wired systems.

Of course, one could provide the channel selector switch with detents at the intended location of the various channels. This, however, would not provide an accurate channel selection in a wireless system of the traditional type, since, as in the case of VHF television channel selection, some fine tuning is often required in addition to the basic actuation of the stepped rotary channel selector. In practice, the need for such fine tuning would burden the average passenger unduly, especially in a dark or dimly lit environment.

Using state of the art components and technology, the preferred embodiment illustrated in FIGS. 4 to 6 provides for accurate and drift-free stepped or detent-type channel selection with a frequency synthesizer 81 in combination with the above mentioned essential components of the system.

In particular, FIG. 6 shows the channel selector 28 as a rotary switching device for providing at 82 four binary coded signals for the selection of, say, 12 channels in a hexadecimal system. By way of example, the rotary switch 28 may be provided with four parallel contacts actuated by four ganged cams for providing the four binary coded signals required for the desired channel selection process.

The output of the rotary selector switch is applied to a synthesizer integrated circuit 83 which, by way of example, may be of the type MC 145106 as described, for instance, in the MOTOROLA SEMICONDUCTORS Advance Information Bulletin ADI-431 (1977).

A crystal controlled frequency standard 84 establishes all frequencies for the various channels in the particular passenger control unit 22.

As shown in FIG. 6, the frequency synthesizer circuitry includes an oscillator and mixer component 86 which, by way of example, may be provided by an integrated circuit of the type CA 3028 as shown, for instance, in the RCA INTEGRATED CIRCUITS DATABOOK (1976), pp. 118 to 122.

The mixer output of the integrated circuit 86 is applied to a bandpass filter 87 and hence to the number 2 input of the synthesizer integrated circuit 83. An output of the frequency standard 84 is also applied via a lead 89 to the number 5 input of the oscillator and mixer circuit 86 and to the second input of the second mixer 65 via buffer amplifier 67 shown in FIG. 5.

The number 4 output of the integrated circuit component 86 is applied via a lead 91 to an isolating buffer amplitude 92 and hence to a bandpass filter 93. Leads 95, 96 and 97 supply battery power to the various components of the synthesizer.

The output of the BPF 93 is applied to a first frequency multiplier 99 and hence via lead 100 to the above mentioned frequency multiplier 58 for application to the second input of the first mixer 56, as mentioned above. The passenger control unit according to the illustrated preferred embodiment is thus capable of providing detented channel selection without the use of any tunable oscillator of a traditional type.

Figure 7:
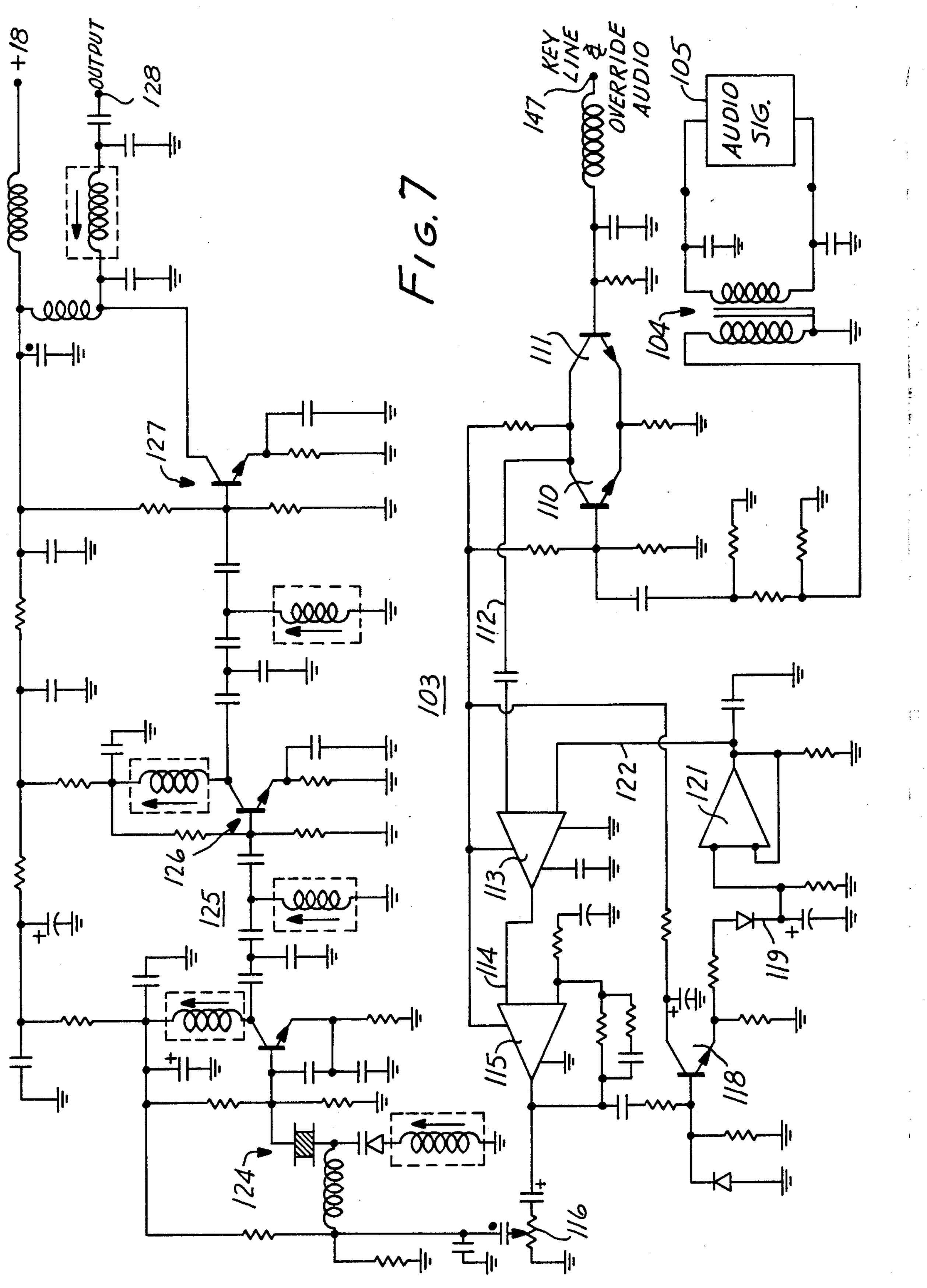
FIG. 7 is a circuit diagram of a radio frequency audio transmitter according to a preferred embodiment of the subject invention.

FIG. 7 is a circuit diagram of a frequency modulation transmitter that may be employed for each of the audio channels. The transmitter 103 has an input transformer 104 for receiving an electric audio signal from a source 105. By way of example, the source 105 may include a playback channel of a sound recorder or playback machine or the output of the sound accompaniment portion of a motion picture projection system or of a prerecorded video tape playback machine. In this respect, FIG. 2 shows a motion picture or video projector 106 mounted in or at the ceiling 20 of the passenger section 14 for projecting motion picture or video presentations 107 onto a screen 108 for viewing by seated passengers 53 listening at the time to a sound accompaniment of the pictorial presentation.

The output of the transformer 104 of the transmitter according to FIG. 7 is applied to one of two reciprocal switching transistors 110 and 111. The output of these switching transistors is applied via a lead 112 to a first input of an automatic gain control stage 113. The output of the gain controlled audio signal is applied via lead 114 to an operational amplifier 115 providing a relatively flat amplification. A potentiometer 116 at the output of the amplifier 115 permits setting of the deviation of the transmitter.

The automatic gain control also includes an emitter follower 118 connected to a feedback circuit and driving a detector 119 with time constant. A direct-current voltage follower 121 derives from the detector 119 a gain control signal for the automatic gain control stage 113 via a lead 122.

The audio signal appearing at the wiper of the potentiometer 116 is modulated on a carrier by means of a varicap crystal oscillator 124. The second harmonic of the oscillator frequency is selected by the doubletuned circuit 125. In this manner, a carrier is phase or frequency modulated with the audio signal in the particular channel. This modulation is followed by a further frequency doubling in a frequency doubler 126 driving an output amplifier 127. The modulated carrier appears at the transmitter output 128.

In the illustrated embodiment there are as many transmitters of the type of transmitter 103 as there are audio channels. These transmitters provide several radio frequency carriers, each corresponding to a different one of the audio signal channels and each having a frequency different from the frequency of any other carrier of the several carriers individually provided by the transmitter 103 and the other transmitters of the system.

The modulator at 124 and 125, and the modulators of the other transmitters of the system modulate the several radio frequency carriers with audio signals in the audio channels by modulating the audio signals in each channel on the corresponding radio frequency carrier.

The modulated radio frequency carriers are applied at their respective frequencies directly to the single antenna or single antenna system 16. In other words, each modulated radio frequency carrier is applied to the antenna 16 at its transmitter output frequency, without any additional modulation, heterodyning or frequency shifting.

In the case of an amplitude modulation (AM) system, each modulated carrier is applied at its carrier frequency to the antenna 16. In the case of a frequency modulation (FM) system, each modulated carrier is applied to the antenna at its carrier frequency, plus/-minus the frequency excursion or deviation proportional to the amplitude of the modulating signal.

The applied modulated radio frequency carriers are then transmitted at their respective frequencies into the space within the passenger section 14 by the single antenna system or single antenna 16.

To this end, a radio frequency channel combiner 132 may be employed between the transmitter 103 and the other channel transmitters on the one hand, and the antenna or antenna system 16 on the other hand. In particular, the output terminal 128 of the transmitter 103 shown in FIG. 7 appears as input terminal 128 of the radio frequency combiner 132 in FIG. 8.

In order to combine the distinct modulated radio frequency signals from the several transmitters 103, etc., the combiner 132 comprises a series of combining or hybrid circuits, such as a series of hybrid transformers 133, each having two inputs, such as 128 and 128', for receiving the modulated radio frequency outputs from two transmitters 103, etc.

Figure 8:
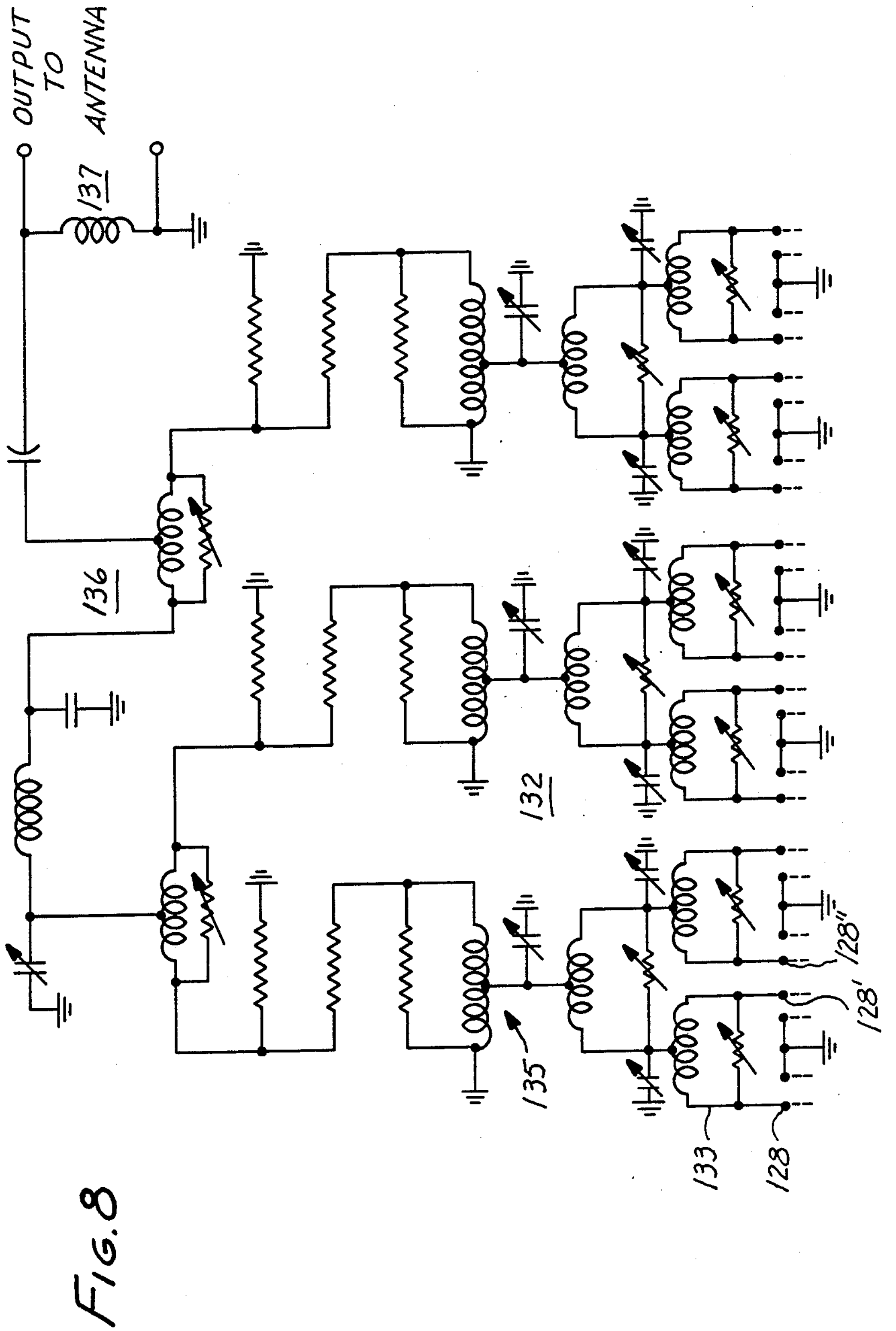
FIG. 8 is a circuit diagram of a combiner for applying different radio frequency channels to the transmission antenna according to a preferred embodiment of the subject invention.

In the combiner 132 shown in FIG. 8 there are, by way of example, six hybrid transformers 133 for combining twelve audio-modulated radio frequency channels or carriers in pairs. These pairs are combined with other pairs of the twelve channels in a binary manner [2, 4, 8 . . . ] by further hybrid circuitry 135 until all twelve channels or audio-modulated radio frequency channels appear at a single combiner output 137.

If desired or necessary step-up transformer and attenuator circuitry 136 may be employed for impedance leveling purposes, in order to equalize the power levels of the modulated radio frequency carriers transmitted through the passenger section 14.

The combiner 132 thus linearly sums the modulated radio frequency carriers, with its hybrid circuitry 133 and 135 assuring practical isolation of these carriers from each other, and thus avoiding undesired cross-modulation or other non-linear modulation effects. The linearly summed modulated carriers appearing at the combiner output 137 are directly applied to the antenna or single antenna system 16, without any heterodyning, frequency shifting or modulation, other than the frequency modulation of each carrier by the corresponding audio channel in the modulator circuitry 124 and 125 and the frequency multiplication at 126 shown in FIG. 7.

Unlike in the case of time division multiplexing, the modulated radio frequency carriers in the subject embodiment are applied simultaneously to the single antenna or antenna system 16.

Unlike in the case of conventional forms of frequency division multiplexing, the modulated radio frequency carriers in the subject embodiment are applied at their respective frequencies directly to the single antenna or antenna system 16.

In practice, this avoids the highly complex receiving equipment necessary for conventional frequency division multiplexing, which could not readily be implemented in the context of aircraft passenger seats.

Also, while FIG. 8 illustrates a specially designed combiner 132, such circuitry is commercially available, though being manufactured and sold for a different purpose.

Figure 9:
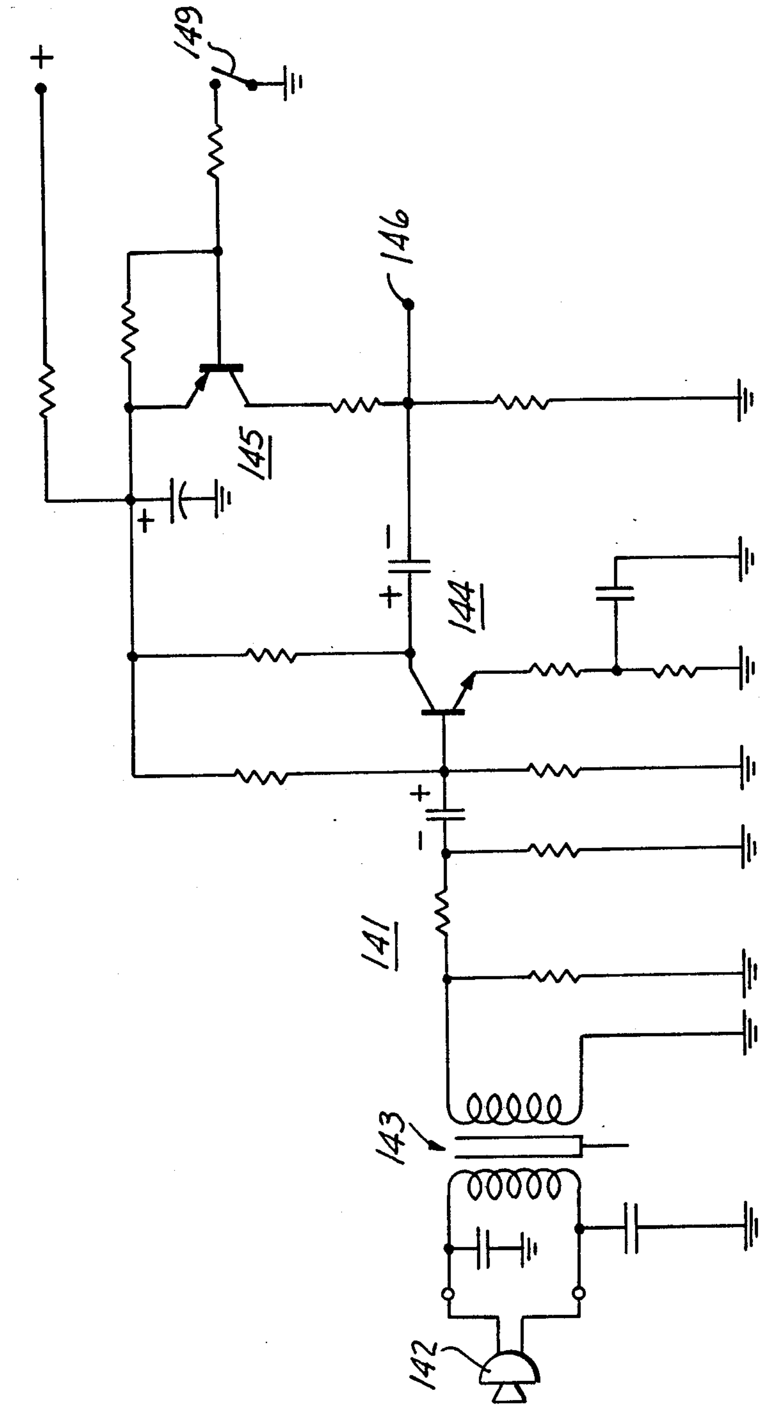
FIG. 9 is a circuit diagram for an override audio apparatus which may be employed in the system according to a preferred embodiment of the subject invention.

Operational procedures and other considerations require from time to time that passengers be reliably reached with information from the captain or other officer or from a supervisory flight attendant. To this end, FIG. 9 shows an override audio circuit 141 which is driven by a microphone 142.

Electric signals corresponding to words spoken into the microphone 142 are applied via an input transformer 143 to audio amplifier stage 144. The amplified audio is applied via an output terminal 146 to override audio terminals 147 of the transmitters 103 et seq. of all channels simultaneously.

In order to generate a key line signal, the officer or flight attendant pushes a microphone switch 149. This turns on a transistorized switch 145, generating a positive voltage at the output 146, upon which is superimposed the audio output of 144.

The audio signal and the direct current resulting from the key line activation are applied in combination to the input terminal 147 shown in FIG. 7. The direct current voltage of this combination raises the base of transistor 111 to a more positive voltage than the base of transistor 110, causing the current normally flowing in transistor 110 to be diverted to transistor 111. In consequence, the audio applied from the source 105 to the transistor 110 is turned off, while the audio from the microphone 142 is turned on, with reference to the output 112.

This simultaneously occurs in all channels, so that none of the passengers will miss the particular information or instruction. As already indicated above, the system according to the illustrated preferred embodiment of the subject invention is capable of satisfying this and all the other above mentioned requirements for the passengers throughout an entire aircraft of the size of a Boeing 727 at a maximum antenna power input of only 10 mW per channel. At the same time, the employed frequency band according to the subject invention prevents windows 149 and other cutouts on the aircraft from radiating any significant amount of the transmitted radio energy.

While the transmission of audio information has been emphasized therein, the disclosed principles could also be employed to transmit video information, control signals or other data.

The subject extensive disclosure will sugggest or render apparent various modifications and variations within the spirit and scope of the subject invention to those skilled in the art.

I claim:

1. A method of supplying audio information in several audio channels via headsets to passengers seated aboard an aircraft in rows of seats including armrests and being distributed along an elongate passenger section inside a metallic fuselage, comprising in combination the steps of:

running a transmitting antenna along the passenger section of said aircraft for radio transmission inside such elongate passenger section in a frequency range including at least a band between 72 and 73 MHz;

providing individual antennas for said seats for receiving said radio transmission and distributing such receiving antennas among predetermined armrests of said seats;

providing said audio information in radio frequency channels in said band between 72 and 73 MHz;

coupling said distributed receiving antennas via seated passengers to said transmitting antenna;

transmitting said radio frequency channels in said band via said transmitting antenna, seated passengers and distributed receiving antennas to said predetermined armrests;

deriving said audio information in said audio channels from said transmitted radio frequency channels in said predetermined armrests;

individually enabling passengers to select audio information from among audio channels containing said derived audio information; and applying said selected audio information individually to said headsets.

2. A method as claimed in claim 1, wherein:

said providing of audio information in radio frequency channels includes providing several radio frequency carriers, each corresponding to a different one of said audio channels and each having a frequency different from the frequency of any other carrier of said several carriers, and modulating said radio frequency carriers with audio signals by modulating audio signals in each channel on the corresponding radio frequency carrier; and said transmitting of radio frequency channels includes applying said modulated radio frequency carriers at their respective frequencies directly and simultaneously to said transmitting antenna, and transmitting said applied modulated radio frequency carriers at their respective frequencies with said transmitting antenna.

3. In a method of supplying audio information in several audio channels to passengers aboard an aircraft, the improvement comprising in combination the steps of:

providing several radio frequency carriers, each corresponding to a different one of said audio channels and each having a frequency different from the frequency of any other carrier of said several carriers;

modulating said radio frequency carriers with audio signals by modulating audio signals in each channel on the corresponding radio frequency carrier;

providing an antenna in said aircraft;

providing a series of hybrid transformers having inputs for receiving said modulated radio frequency carriers;

applying said modulated radio frequency carriers at their respective frequencies via said hybrid transformers directly and simultaneously to said antenna; and transmitting said applied modulated radio frequency carriers at their respective frequencies with said antenna in said aircraft.

4. A method as claimed in claim 3, wherein:

said applying of said modulated radio frequency carriers includes linearly summing said modulated radio frequency carriers; and said transmitting includes transmitting said linearly summed modulated radio frequency carriers with said antenna in said aircraft.

5. A method as claimed in claim 3 or 4, including the steps of:

providing a plurality of receiving antennas at different locations in said aircraft; and receiving said transmitted modulated radio frequency carriers with said receiving antennas.

6. In a method of transmitting signals in several distinct signal channels simultaneously via a single antenna system, the improvement comprising in combination the steps of:

providing several radio frequency carriers, each corresponding to a different one of said signal channels and each having a frequency different from the frequency of any other carrier of said several carriers;

modulating said radio frequency carriers with signals in said signal channels by modulating the signals in each channel on the corresponding radio frequency carrier;

providing a series of hybrid transformers having inputs for receiving said modulated radio frequency carriers;

applying said modulated radio frequency carriers at their respective frequencies via said hybrid transformers directly and simultaneously to said single antenna system; and transmitting said applied modulated radio frequency carriers at their respective frequencies with said single antenna system.

7. A method as claimed in claim 6, wherein:

said applying of said modulated radio frequency carriers includes linearly summing said modulated radio frequency carriers; and said transmitting includes transmitting said linearly summed modulated radio frequency carriers.

8. A method as claimed in claim 6 or 7, including the steps of:

providing a plurality of receiving antennas at different locations; and receiving said transmitted modulated radio frequency carriers with said receiving antennas.

9. A method as claimed in claim 6 or 7, wherein:

said modulating of radio frequency carriers includes modulating each radio frequency carrier with audio signals of a different audio signal channel.

10. Apparatus for supplying audio information in several audio channels via headsets to passengers seated aboard an aircraft in rows of seats including armrests and being distributed along an elongate passenger section inside a metallic fuselage, comprising in combination:

first means for providing said audio information in radio frequency channels in a frequency band between 72 and 73 MHz;

second means connected to said first means and including an antenna extending along the elongate passenger section of said aircraft for transmitting said radio frequency channels inside the elongate passenger section of said aircraft;

third means including individual antennas for said seats for receiving said transmitted radio frequency channels;

fourth means connected to said receiving antennas for deriving said audio information in said audio channels from said received radio frequency channels;

fifth means connected to said fourth means for individually enabling passengers to select audio information from among audio channels containing said derived audio information;

sixth means connected to said fifth means for applying said selected audio information individually to said headsets; and seventh means for distributing said receiving antennas, fourth means, fifth means and sixth means among said seats, including means for mounting said receiving antennas, fourth means, fifth means and sixth means at least partially in predetermined armrests of said seats.

11. Apparatus as claimed in claim 10, wherein:

said first means include means for providing several radio frequency carriers, each corresponding to a different one of said audio channels and each having a frequency different from the frequency of any other carrier of said several carriers, and means for modulating said radio frequency carriers with audio signals, including means for modulating audio signals in each channel on the corresponding radio frequency carrier; and said second means include means connected to said modulating means for applying said modulated radio frequency carriers at their respective frequencies directly and simultaneously to said antenna extending along said elongate passenger section.

12. In apparatus for supplying audio information in several audio channels to passengers aboard an aircraft, the improvement comprising in combination:

means for providing several radio frequency carriers, each corresponding to a different one of said audio channels and each having a frequency different from the frequency of any other carrier of said several carriers;

means connected to said providing means for modulating said radio frequency carriers with audio signals, including means for modulating audio signals in each channel on the corresponding radio frequency carrier;

an antenna in said aircraft; and means connected to said modulating means for applying said modulated radio frequency carriers at their respective frequencies directly and simultaneously to said antenna for transmission thereby;

said applying means including a radio frequency channel combiner comprising a series of hybrid circuits including a series of hybrid transformers having inputs for receiving said modulated radio frequency carriers.

13. Apparatus as claimed in claim 12, wherein:

said means for providing several radio frequency carriers and said means for modulating said radio frequency carries comprise a separate radio frequency transmitter for each audio channel.

14. Apparatus as claimed in claim 12, wherein:

said applying means comprise means for linearly summing said modulated radio frequency carriers and means connected to said antenna for applying said linearly summed modulated radio frequency carriers directly to said antenna for transmission thereby.

15. Apparatus as claimed in claim 12, 13 or 14, including:

a plurality of radio frequency receivers, each including a receiving antenna, for receiving the transmitted radio frequency carriers.

16. In apparatus for transmitting signals in several distinct signal channels simultaneously via a single antenna system, the improvement comprising in combination:

means for providing several radio frequency carriers, each corresponding to a different one of said signal channels and each having a frequency different from the frequency of any other carrier of said several carriers;

means connected to said providing means for modulating said radio frequency carriers with signals in said signal channels, including means for modulating the signals in each channel on the corresponding radio frequency carrier; and means connected to said modulating means for applying said modulated radio frequency carriers at their respective frequencies directly and simultaneously to said single antenna system for transmission thereby;

said applying means including a radio frequency channel combiner comprising a series of hybrid circuits including a series of hybrid transformers having inputs for receiving said modulated radio frequency carriers.

17. Apparatus as claimed in claim 16, wherein:

said means for providing several radio frequency carriers and said means for modulating said radio frequency carriers comprise a separate radio frequency transmitter for each signal channel.

18. Apparatus as claimed in claim 16, wherein:

said applying means comprise means for linearly summing said modulated radio frequency carriers and means connected to said antenna system for applying said linearly summed modulated radio frequency carriers directly to said single antenna system for transmission thereby.

19. Apparatus as claimed in claim 16, 17 and 18, including:

a plurality of radio frequency receivers, each including a receiving antenna, for receiving the transmitted radio frequency carriers.

20. Apparatus as claimed in claim 16, 17 or 18, wherein:

said modulating means include means for modulating each radio frequency carrier with audio signals of a different audio signal channel.

21. A method of supplying audio information in several audio channels via headsets to passengers seated aboard an aircraft in rows of seats including armrests and being distributed along an elongate passenger section inside a metallic fuselage, comprising in combination the steps of:

running a transmitting antenna from a transmitter to an antenna termination along the passenger section of said aircraft for radio transmission inside such elongate passenger section in a frequency range including at least a band between 72 and 73 MHz;

providing individual antennas for said seats for receiving said radio transmission and distributing such receiving antennas among predetermined armrests of said seats;

providing said audio information in radio frequency channels in said band between 72 and 73 MHz;

coupling said distributed receiving antennas via seated passengers to said transmitting antenna;

transmitting said radio frequency channels in said band with said transmitter via said transmitting antenna, seated passengers and distributed receiving antennas to said predetermined armrests;

deriving said audio information in said audio channels from said transmitted radio frequency channels in said predetermined armrests;

individually enabling passengers to select audio information from among audio channels containing said derived audio information; and applying said selected audio information individually to said headsets.

22. A method as claimed in claim 1, wherein:

said providing of audio information in radio frequency channels includes providing several radio frequency carriers, each corresponding to a different one of said audio channels and each having a frequency different from the frequency of any other carrier of said several carriers, and modulating said radio frequency carriers with audio signals by modulating audio signals in each channel on the corresponding radio frequency carrier; and said transmitting of radio frequency channels includes applying said modulated radio frequency carriers at their respective frequencies directly and simultaneously to said transmitting antenna, and transmitting said applied modulated radio frequency carriers at their respective frequencies with said transmitting antenna.

23. Apparatus for supplying audio information in several audio channels via headsets to passengers seated aboard an aircraft in rows of seats including armrests and being distributed along an elongate passenger section inside a metallic fuselage, comprising in combination:

means including a transmitter for providing said audio information in radio frequency channels in a frequency band between 72 to 73 MHz;

means connected to said providing means and including an antenna termination and an antenna extending from said transmitter to said antenna termination along the elongate passenger section of said aircraft for transmitting said radio frequency channels inside the elongate passenger section of said aircraft;

means including individual antennas for said seats for receiving said transmitted radio frequency channels;

means connected to said receiving antennas for deriving said audio information in said audio channels from said received radio frequency channels;

means connected to said deriving means for individually enabling passengers to select audio information from among audio channels containing said derived audio information;

means connected to said enabling means for applying said selected audio information individually to said headsets; and means for distributing said receiving antennas, deriving means, enabling means and applying means among said seats, including means for mounting said receiving antennas, deriving means, enabling means and applying means at least partially in predetermined armrests of said seats.

24. Apparatus as claimed in claim 23, wherein:

said means for providing said audio information in radio frequency channels include means for providing several radio frequency carriers, each corresponding to a different one of said audio channels and each having a frequency different from the frequency of any other carrier of said several carriers, and means for modulating said radio frequency carriers with audio signals, including means for modulating audio signals in each channel on the corresponding radio frequency carrier; and said transmitting means include a radio frequency channel combiner comprising a series of hybrid circuits including a series of hybrid transformers having inputs for receiving said modulated radio frequency carriers and means connected to said hybrid transformers for applying said modulated radio frequency carriers at their respective frequencies directly and simultaneously to said antenna extending along said elongate passenger section.

25. Apparatus as claimed in claim 12, 16 or 24, wherein:

said hybrid transformers each have two inputs for combining said radio frequency carriers in pairs; and said combiner includes hybrid circuitry, connected to said hybrid transformers for combining said pairs further into pairs for transmission by said antenna.

* * * * *